United States Patent
Park et al.

(10) Patent No.: US 9,697,124 B2
(45) Date of Patent: Jul. 4, 2017

(54) SYSTEMS AND METHODS FOR PROVIDING DYNAMIC CACHE EXTENSION IN A MULTI-CLUSTER HETEROGENEOUS PROCESSOR ARCHITECTURE

(71) Applicant: QUALCOMM INCORPORATED, San Diego, CA (US)

(72) Inventors: Hee Jun Park, San Diego, CA (US); Krishna Vsssr Vanka, Hyderapad (IN); Sravan Kumar Ambapuram, Hyderapad (IN); Shirish Kumar Agarwal, Hyderapad (IN); Ashvinkumar Namjoshi, Hyderapad (IN); Harshad Bhutada, Hyderpad (IN)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 14/595,998

(22) Filed: Jan. 13, 2015

(65) Prior Publication Data

US 2016/0203083 A1    Jul. 14, 2016

(51) Int. Cl.
*G06F 12/08* (2016.01)
*G06F 11/34* (2006.01)
(Continued)

(52) U.S. Cl.
CPC .......... *G06F 12/084* (2013.01); *G06F 9/4856* (2013.01); *G06F 9/5016* (2013.01);
(Continued)

(58) Field of Classification Search
None
See application file for complete search history.

(56) References Cited

U.S. PATENT DOCUMENTS 6,021,466 A    2/2000  Olarig
6,751,706 B2   6/2004  Chauvel et al.
(Continued)

OTHER PUBLICATIONS big.Little Technology; ARM The architecture for the Digital World 2013; as published on the internet at https://www.arm.com/products/processors/technologies/biglittleprocessing.php.*

(Continued)

*Primary Examiner* — Reginald Bragdon
*Assistant Examiner* — Paul Knight
(74) *Attorney, Agent, or Firm* — Smith Tempel Blaha LLC

(57) ABSTRACT

A dynamic cache extension in a multi-cluster heterogeneous processor architecture is described. One embodiment is a system comprising a first processor cluster having a first level two (L2) cache and a second processor cluster having a second L2 cache. The system further comprises a controller in communication with the first and second L2 caches. The controller receives a processor workload input and a cache workload input from the first processor cluster. Based on processor workload input and the cache workload input, the cache controller determines whether a current task associated with the first processor cluster is limited by a size threshold of the first L2 cache or a performance threshold of the first processor cluster. If the current task is limited by the size threshold of the first L2 cache, the controller uses at least a portion of the second L2 cache as an extension of the first L2 cache.

26 Claims, 12 Drawing Sheets

(51) Int. Cl.
  *G06F 9/48* (2006.01)
  *G06F 9/50* (2006.01)
  *G06F 12/084* (2016.01)
  *G06F 12/0806* (2016.01)
  *G06F 12/0842* (2016.01)
  *G06F 12/0811* (2016.01)
  *G06F 12/0831* (2016.01)

(52) U.S. Cl.
  CPC .......... *G06F 11/34* (2013.01); *G06F 12/0806* (2013.01); *G06F 12/0842* (2013.01); *G06F 12/0811* (2013.01); *G06F 12/0833* (2013.01); *G06F 2212/1021* (2013.01); *G06F 2212/1028* (2013.01); *G06F 2212/601* (2013.01)

(56) References Cited

U.S. PATENT DOCUMENTS

| | | | |
|---|---|---|---|
| 8,832,174 B2 | 9/2014 | Shin et al. | |
| 2004/0059875 A1* | 3/2004 | Garg | G06F 12/0806 711/141 |
| 2006/0112226 A1* | 5/2006 | Hady | G06F 15/167 711/130 |
| 2006/0248289 A1 | 11/2006 | Vantalon et al. | |
| 2007/0294693 A1* | 12/2007 | Barham | G06F 9/4881 718/102 |
| 2008/0040552 A1* | 2/2008 | Tsuiji | G06F 11/2038 711/131 |
| 2008/0235454 A1 | 9/2008 | Duron et al. | |
| 2009/0235050 A1* | 9/2009 | Raghunath | G06F 9/5038 712/203 |
| 2010/0185821 A1* | 7/2010 | Paver | G06F 12/0831 711/146 |
| 2011/0066830 A1* | 3/2011 | Wolfe | G06F 9/4856 712/228 |
| 2011/0107031 A1* | 5/2011 | Anand | G06F 12/084 711/122 |
| 2011/0213993 A1* | 9/2011 | Greenhalgh | G06F 1/3203 713/320 |
| 2012/0042131 A1* | 2/2012 | Flemming | G06F 12/0284 711/129 |
| 2012/0180061 A1 | 7/2012 | Rao et al. | |
| 2012/0233486 A1* | 9/2012 | Phull | G06F 9/5083 713/375 |
| 2013/0159596 A1* | 6/2013 | Van De Ven | G06F 12/109 711/6 |
| 2013/0173958 A1 | 7/2013 | Atherton et al. | |
| 2013/0346771 A1 | 12/2013 | Boom et al. | |
| 2014/0366030 A1* | 12/2014 | Solihin | G06F 9/4856 718/100 |
| 2015/0324234 A1* | 11/2015 | Chang | G06F 9/5016 718/104 |
| 2016/0004654 A1* | 1/2016 | Dutta | G06F 13/28 710/308 |
| 2016/0077871 A1* | 3/2016 | Kaplan | G06F 9/4881 718/102 |

OTHER PUBLICATIONS

Improving Cache Utilization by Srinivasan; University of Cambridge Jun. 2011.* big.Little Technology: the Future of Mobile; Making very high performance available in a mobile envelope without sacrificing energy efficiency. White Paper by ARM; Published 2013.*

Mihai Pricopi, Task scheduling on adaptive multi-core, IEEE Transactions on Computers, 2013, pp. 1-14.

International Search Report and Written Opinion—PCT/US2016/012374—ISA/EPO—Apr. 20, 2016. (146905WO).

Lee H., et al., "CloudCache: Expanding and Shrinking Private Caches", International Symposium on High-Performance Computer Architecture, Proceedings, Feb. 12, 2011 (Feb. 12, 2011) pp. 219-230, XP055262817, ISSN: 1530-0897, DOI: 10.1109/HPCA.2011.5749731 ISBN: 978-1-4244-9432-3.

* cited by examiner

| Scenario | Scheduler Input | | | Scheduler Output |
|---|---|---|---|---|
| | "Little CPU" Usage % | Little L2 Cache Usage/Miss | Big Cluster Status | |
| 1 | n/a | n/a | Active | Split L2 Mode |
| 2 | < threshold 1 | < threshold 2 | Inactive | Split L2 Mode |
| 3 | > threshold 1 | n/a | Inactive | Task Migration Mode |
| 4 | < threshold 1 | > threshold 2 | Inactive | Cache Extension Mode |

FIG. 3

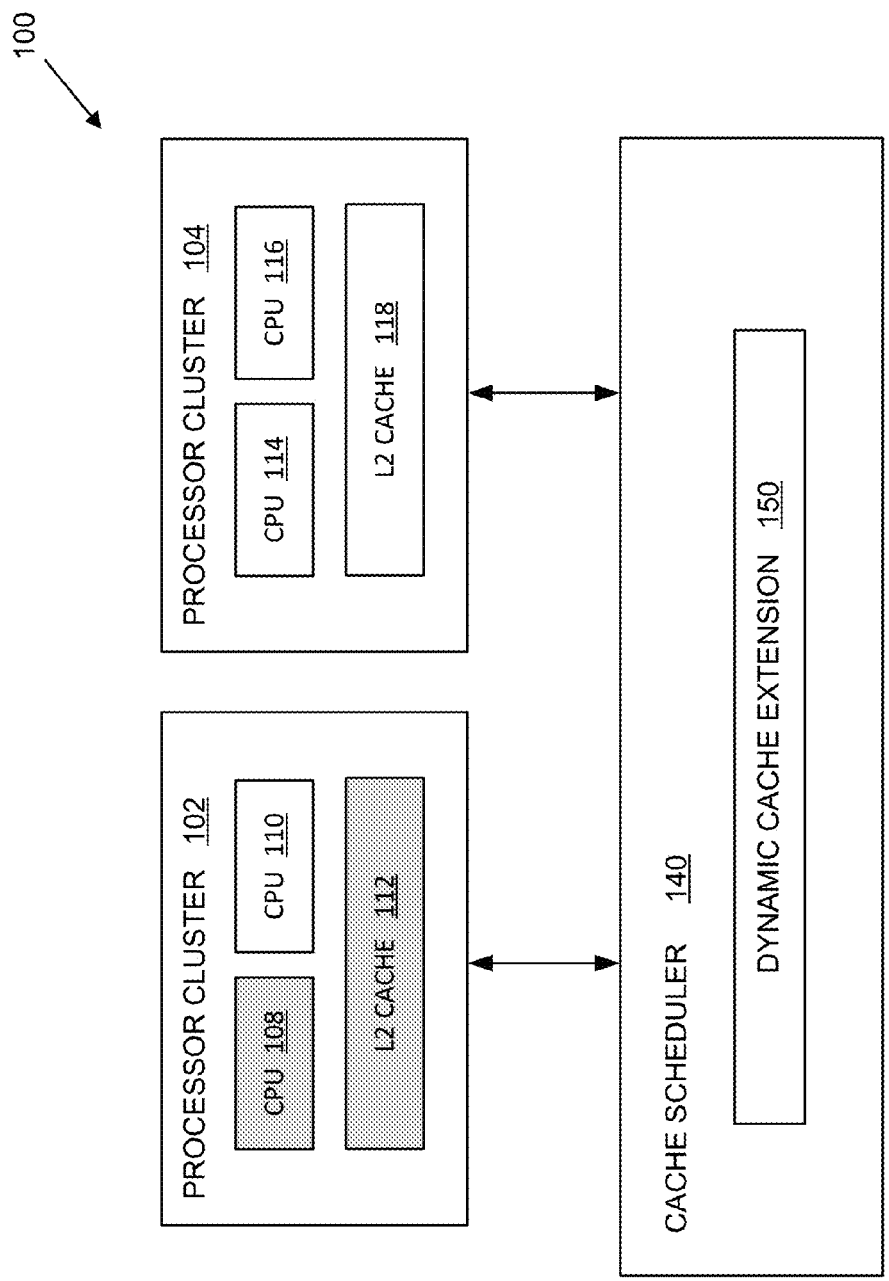

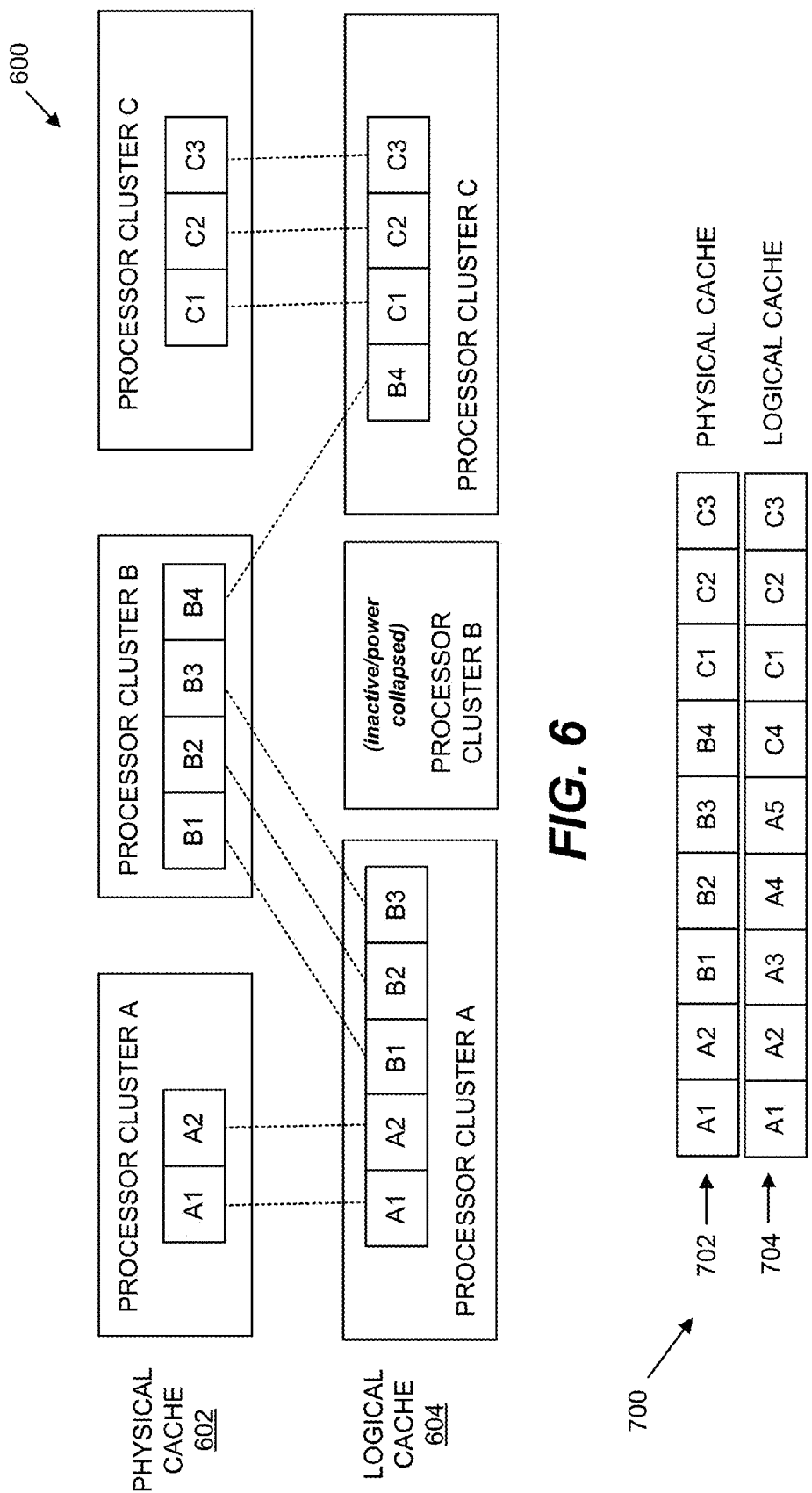

SYSTEMS AND METHODS FOR PROVIDING DYNAMIC CACHE EXTENSION IN A MULTI-CLUSTER HETEROGENEOUS PROCESSOR ARCHITECTURE

DESCRIPTION OF THE RELATED ART

Portable computing devices (e.g., cellular telephones, smart phones, tablet computers, portable digital assistants (PDAs), and portable game consoles) continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising one or more chip components embedded on a single substrate (e.g., one or more central processing units (CPUs), a graphics processing unit (GPU), digital signal processors, etc.).

Such portable computing devices or other computer systems or devices may comprise a multi-cluster heterogeneous processor architecture, an example of which is referred to as a "big.LITTLE" heterogeneous architecture. The "big.LITTLE" and other heterogeneous architectures typically comprise a group of processor cores in which a set of relatively slower, lower-power processor cores are coupled with a set of relatively more powerful processor cores. For example, a set of processors or processor cores with a higher performance ability are often referred to as the "Big cluster" while the other set of processors or processor cores with minimum power consumption yet capable of delivering appropriate performance (but relatively less than that of the Big cluster) is referred to as the "Little cluster." A cache controller may schedule tasks to be performed by the Big cluster or the Little cluster according to performance and/or power requirements, which may vary based on various use cases. The Big cluster may be used for situations in which higher performance is desirable (e.g., graphics, gaming, etc.), and the Little cluster may be used for relatively lower power user cases (e.g., text applications).

Existing multi-cluster heterogeneous processor architectures, however, may not effectively optimize performance/power in certain use cases. For instance, use cases with wide memory access but relatively light CPU workload may experience undesirable level two (L2) cache misses. Existing architectures may interpret this type of use case/workload as a relatively heavy CPU workload due to execution latency. As a result, if a task gets migrated to the Big cluster, the system may experience a power penalty. Alternatively, if the task is left running on the Little cluster, performance may suffer. Furthermore, if the scheduler migrates tasks from a Little cluster having a smaller size L2 cache to a Big cluster having a larger L2 cache, the system may consume excessive power. If the scheduler keeps tasks in the Little with the smaller size L2 cache, then this may result in low performance and an undesirable user experience.

Accordingly, there is a need in the art for systems and methods for scheduling and managing tasks in multi-cluster heterogeneous processor architectures with optimized performance and power consumption.

SUMMARY OF THE DISCLOSURE

Various embodiments of methods, systems, and computer programs are disclosed for providing dynamic cache extension in a multi-cluster heterogeneous processor architecture in a portable computing device. One such method involves receiving a processor workload input and a cache workload input for a first processor cluster and an associated first cache in a multi-cluster heterogeneous processor architecture comprising the first processor cluster and a second processor cluster having an associated second cache. Based on the processor workload input and the cache workload input, it is determined whether a current task associated with the first processor cluster is limited by a size threshold of the first cache or a performance threshold of the first processor cluster. If the current task is limited by the size threshold of the first cache, at least a portion of the second cache associated with the second processor cluster may be used as an extension of the first cache.

Another embodiment is a system having a multi-cluster heterogeneous processor architecture for providing dynamic cache extension. The system comprises a first processor cluster comprising a first level 2 (L2) cache, and a second processor cluster comprising a second. L2 cache. A cache controller in communication with the first and second L2 caches is configured to receive a processor workload input and a cache workload input from the first processor cluster. Based on the processor workload input and the cache workload input, the cache controller may determine whether a current task associated with the first processor cluster is limited by a size threshold of the first L2 cache or a performance threshold of the first processor cluster. If the current task is limited by the size threshold of the first L2 cache, the cache controller may use at least a portion of the second L2 cache associated with the second processor cluster as an extension of the first L2 cache.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 3 is a data table illustrating exemplary data inputs and resulting data outputs of the cache scheduler in FIG. 2.

FIG. 5a is a functional block diagram illustrating an embodiment of the system of FIG. 1 for implementing dynamic cache extension.

FIG. 6 is a block diagram illustrating a physical-to-logical cache mapping for implementing dynamic cache extension.

FIG. 7 is an embodiment of a look-up table managed by the cache controller for implementing the physical-to-logical mapping of FIG. 6.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" or "image" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
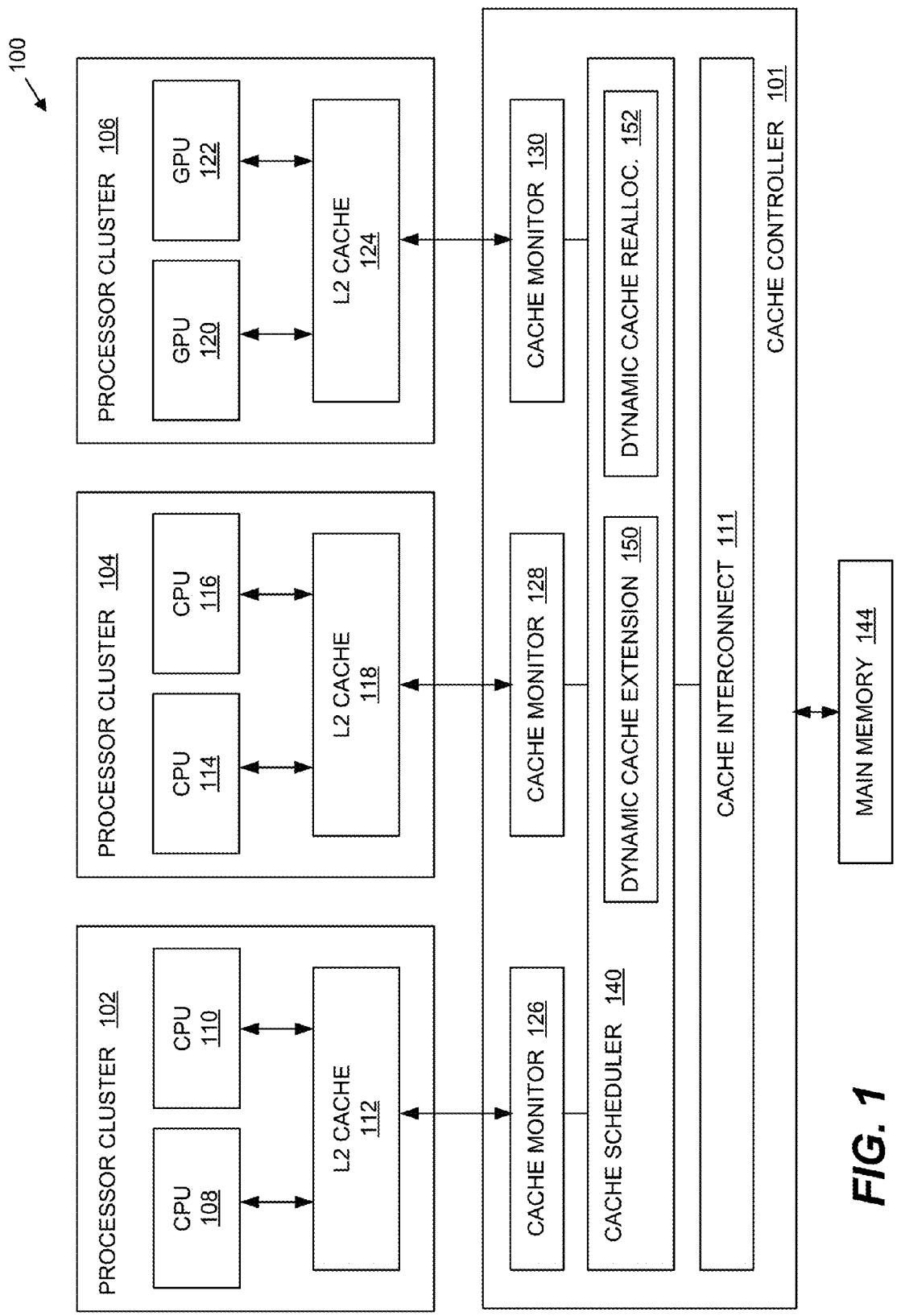
FIG. 1 is a block diagram of an embodiment of a system comprising a multi-cluster heterogeneous processor architecture that includes a cache scheduler for providing dynamic cache extension and dynamic cache reallocation between processor clusters.

FIG. 1 is a block diagram of an embodiment of a system 100 comprising a multi-cluster heterogeneous processor architecture. The system 100 may be implemented in any computing device, including a personal computer, a workstation, a server, a portable computing device (PCD), such as a cellular telephone, a portable digital assistant (PDA), a portable game console, a palmtop computer, or a tablet computer. The multi-cluster heterogeneous processor architecture comprises a plurality of processor clusters coupled to a cache controller 101. As known in the art, each processor cluster may comprise one or more processors or processor cores (e.g., central processing unit (CPU), graphics processing unit (GPU), digital signal processor (DSP), etc.) with a corresponding dedicated cache.

In the embodiment of FIG. 1, the processor clusters 102 and 104 may comprise a "big.LITTLE" heterogeneous architecture, as described above, in which the processor cluster 102 comprises a Little cluster and the processor cluster 104 comprises a Big cluster. The Little processor cluster 102 comprises a plurality of central processing unit (CPU) cores 108 and 110 which are relatively slower and consume less power than the CPU cores 114 and 116 in the Big processor cluster 104. It should be appreciated that the Big cluster CPU cores 114 and 116 may be distinguished from the Little cluster CPU cores 108 and 110 by, for example, a relatively higher instructions per cycle (IPC), higher operating frequency, and/or having a micro-architectural feature that enables relatively more performance but at the cost of additional power. Furthermore, additional processor clusters may be included in the system 100, such as, for example, a processor cluster 106 comprising GPU cores 120 and 122.

Processor clusters 102, 104, and 106 may have independent cache memory used by the corresponding processors in the system 100 to reduce the average time to access data from a main memory 144. In an embodiment, the independent cache memory and the main memory 144 may be organized as a hierarchy of cache levels (e.g., level one (L1), level two (L2), level three (L3). Processor cluster 102 may comprise L2 cache 112, processor cluster 104 may comprise L2 cache 118, and processor cluster 106 may comprise L2 cache 124.

As illustrated in FIG. 1, the cache controller 101 may comprise a cache scheduler 140, a cache interconnect 111, and a plurality of cache monitors 126, 128, and 130 for monitoring the performance of L2 cache 112, 118, and 124, respectively. Cache interconnect 111 comprises an interconnect or bus with associated logic for maintaining coherency between main memory 144 and L2 cache 112, 118, and 124. As described below in more detail, the cache scheduler 140 generally comprises logic configured to monitor processor and cache performance and optimally manage task scheduling to the processor clusters 101, 104, and 106 according to power and performance requirements of the system 100.

Figure 2:
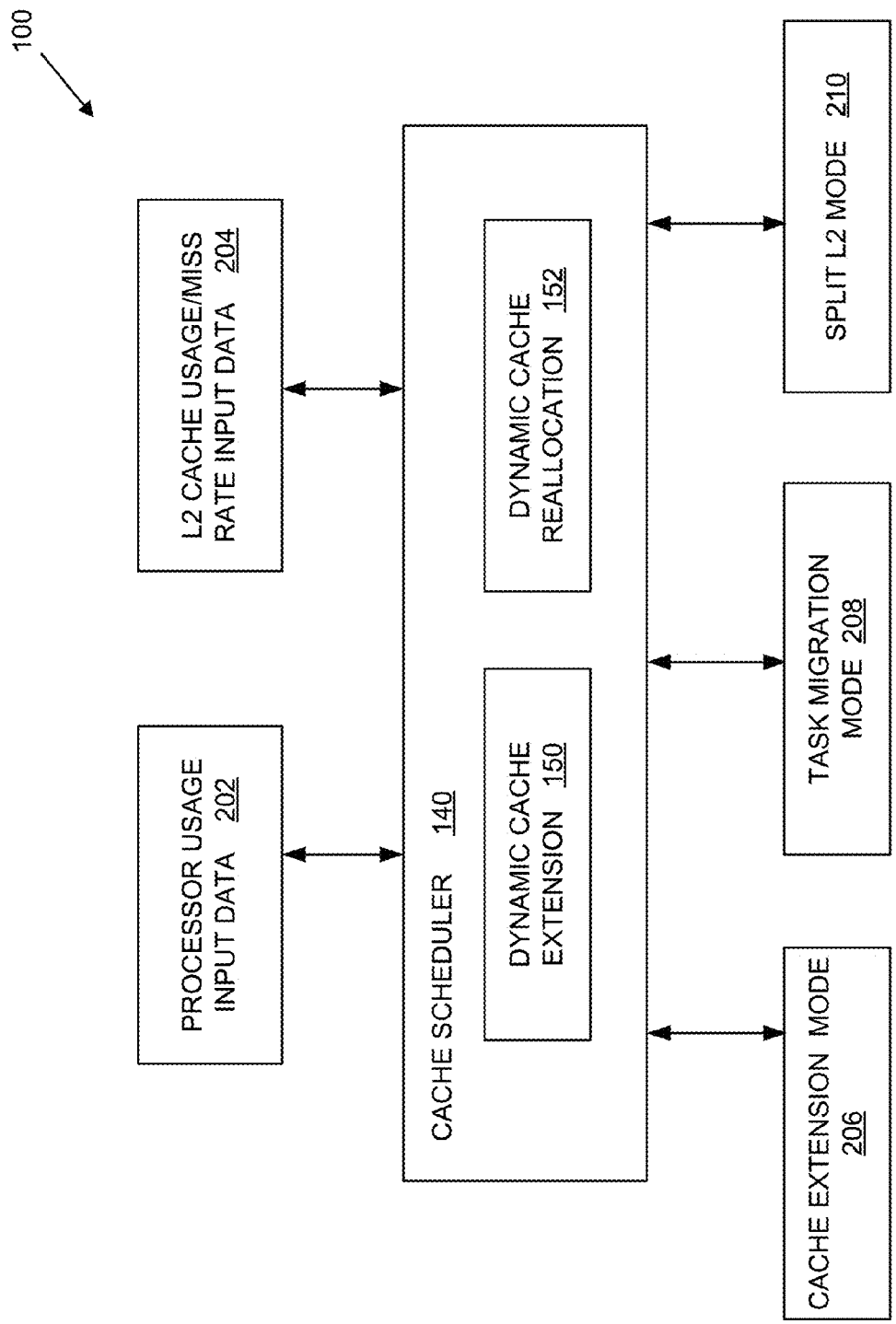
FIG. 2 is a block diagram illustrating the data inputs and outputs of an embodiment of the cache scheduler in the system of FIG. 1.

FIG. 2 is a block diagram illustrating the data inputs and outputs of an embodiment of the cache scheduler 140. The cache scheduler 140 may receive as data inputs, from each processor cluster, processor usage input data 202 and L2 cache usage/miss rate input data 204. It should be appreciated that processor usage input data 202 may indicate processor workload based on one or more of the following or other parameters received from processor clusters 102, 104, and 106: instructions per cycle (IPC), million instructions per second (MIPS), frequency, CPU active duration percentage. L2 cache input data 204 may indicate L2 cache workload or performance based on one or more of the following or other parameters received via cache monitors 126, 128, and 130: cache misses per 1000 instructions (MPKI), cache accesses per 1000 instructions (APKI), L2 cache miss rate (MPKI/APKI), CPU stall time/ratio or stall clocks due to cache misses, and million cycles per second (MCPS) indicating an amount of CPU stalls due to cache misses.

Based on the input data 202 and 204, the cache scheduler 140 determines whether a processing bottleneck or other system limitation is being (or will be) caused by (1) processor/CPU performance or (2) the size of the L2 cache. For example, the cache scheduler 140 may determine that a current task associated with the Little processor cluster 102 is limited by CPU performance. The processor usage input data 202 may indicate that the CPU workload is more than can be desirably handled by the Little processor cluster 102. In response, cache scheduler 140 (e.g., dynamic cache reallocation module(s) 152), may initiate a task migration mode 208 for migrating the task to from the Little processor cluster 102 to the Big processor cluster 104 where it can be executed by CPU 114 or CPU 116 with more desirable performance than available via CPU 108 or CPU 100. Alternatively, the cache scheduler 140 may determine that the current task associated with the Little processor cluster 102 is limited by the size of the L2 cache 112. The input data 204 may indicate that the size of L2 cache 112 is the limitation (not CPU performance). In response, the cache scheduler 140 (e.g., dynamic cache extension module(s) 150) may initiate a cache extension mode 206 for processing the task via the Little processor cluster 102 but by using a portion of L2 cache 118 (in Big processor cluster 104) as an extended L2 cache or L3 cache. If there are no performance issues with the current task, then the cache scheduler 140 may initiate a default split L2 mode 210 for keeping the current task with L2 cache 112 of the Little processor cluster 102.

As illustrated in FIG. 3, the cache scheduler 140 may access and manage a table 300 for determining whether to initiate cache extension mode 206, task migration mode 208, or the default split mode 210. The table 300 may define a cache size threshold (threshold 2) and a performance threshold (threshold 1). Based on the data inputs 202 and 204, the cache scheduler 140 may determine four exemplary scenarios. In scenario 4, the cache scheduler 140 may initiate the cache extension mode 206 when the Little processor cluster 102 has a CPU usage percentage that does not exceed threshold 1 but an L2 cache usage/miss rate exceeds threshold 2. In scenario 3, the cache scheduler 140 may initiate the task migration mode 208 when the Little processor cluster 102 has a CPU usage percentage that exceeds threshold 1 regardless of the L2 cache usage/miss rate. In scenario 2, the cache scheduler 140 may initiate the default split L2 mode 210 when the Little processor cluster 102 has a CPU usage percentage that does not exceed threshold 1 and an L2 cache usage/miss rate does not exceed threshold 2. Scenario 1 refers to the situation in which the Big processor cluster 104 is actively handling tasks and the system 100 operates in the default split L2 mode 210 for the Big processor cluster 104.

Figure 4:
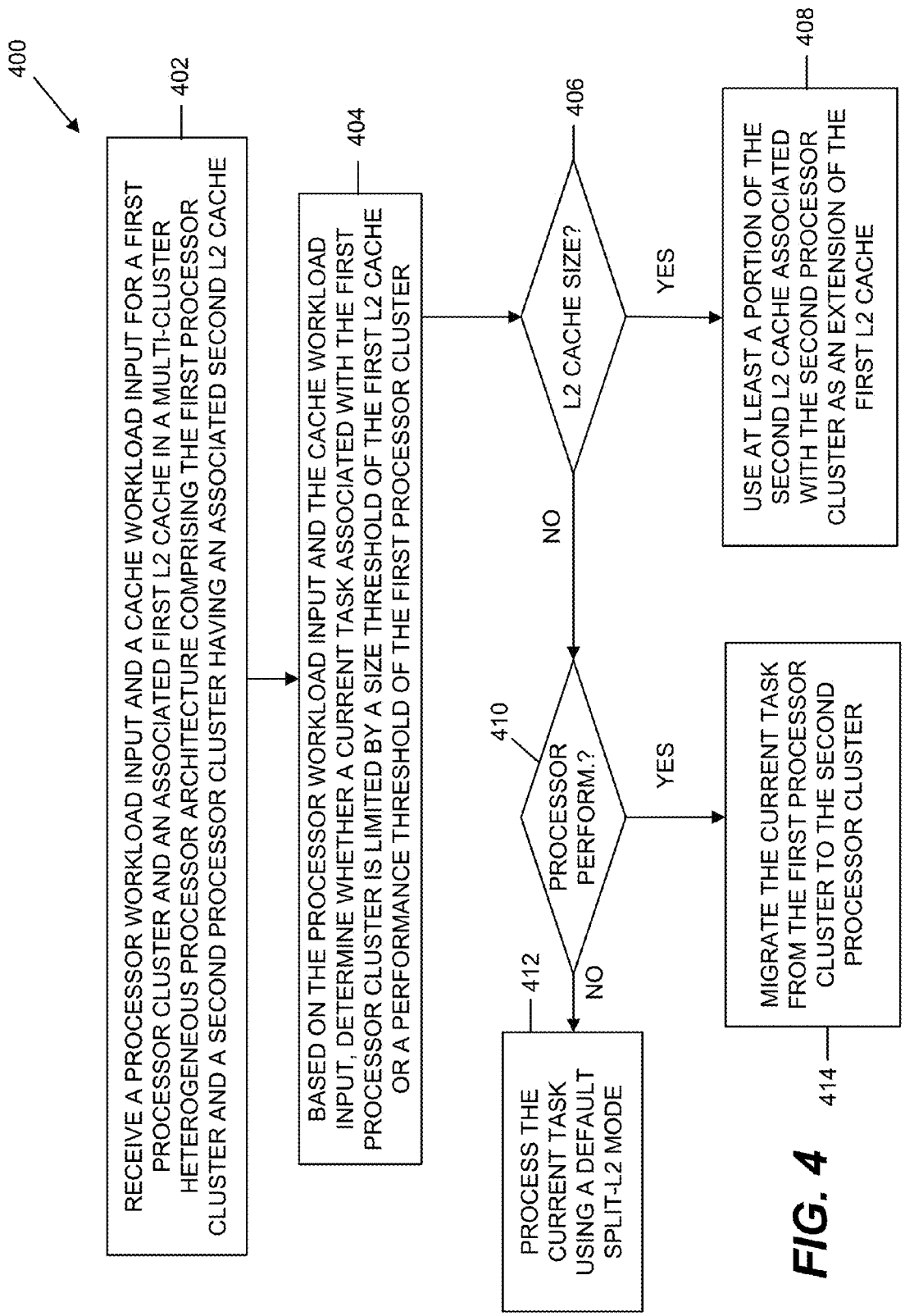
FIG. 4 is a flowchart illustrating an embodiment of a method implemented by the cache scheduler for providing dynamic cache extension and dynamic cache reallocation.

FIG. 4 is a flowchart illustrating an embodiment of a method 400 implemented by the cache scheduler 140. At block 402, the cache scheduler 140 receives a processor workload input and a cache workload input for the Little processor cluster 102 and associated L2 cache 112. The processor and cache workload inputs may comprise any of the parameters mentioned above (inputs 202 and 204-FIG. 2). At block 404, the cache scheduler 140 determines whether a current task associated with the Little processor cluster 102 is limited by a size threshold of L2 cache 112 or a performance threshold of CPU 108 or CPU 110. The performance and size thresholds may be defined in a manner similar to table 300 in FIG. 3. It should be appreciated that the thresholds may be programmatically defined or otherwise. If the cache scheduler 140 determines that the current task is limited by the size threshold of L2 cache 112 (decision block 406), the cache scheduler 140 may use at least a portion of L2 cache 118 associated with the Big processor cluster 104 as an extension of L2 cache 112 (block 408).

Figure 5B:
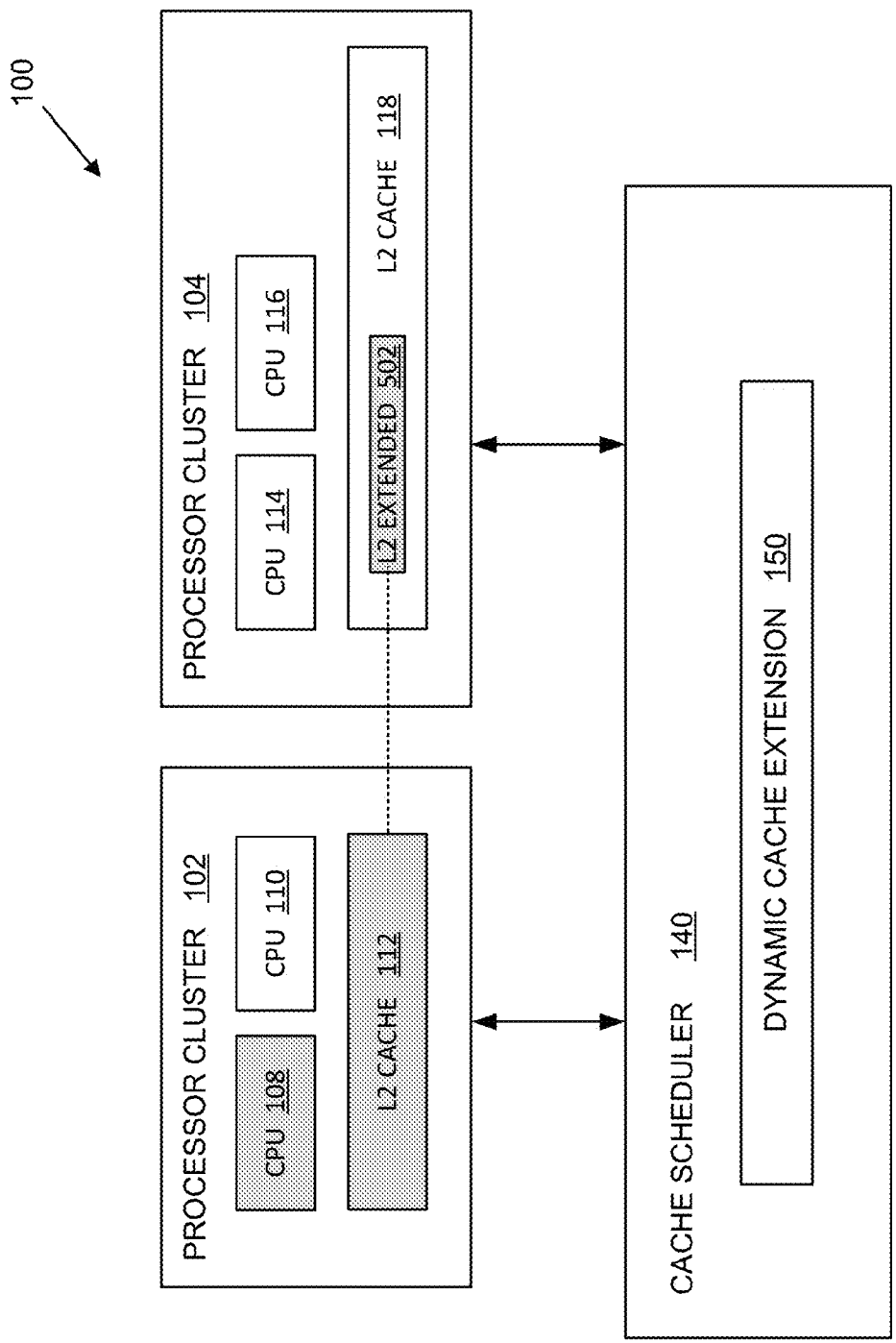
FIG. 5b illustrates the system of FIG. 5a in which the L2 cache of one processor cluster is extended by using a portion of the L2 cache of another processor cluster as additional L2 cache.
Figure 5C:
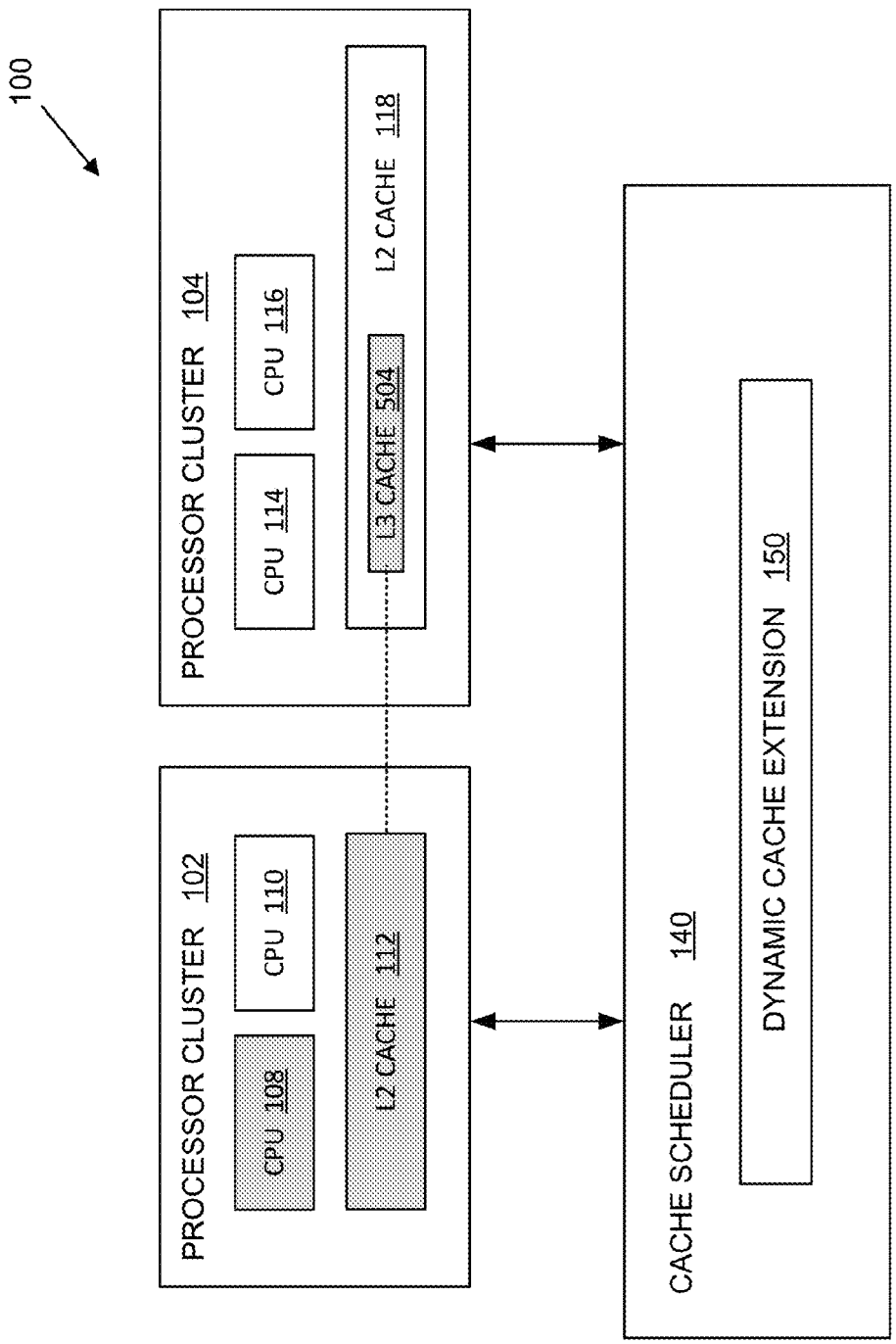
FIG. 5c illustrates the system of FIG. 5a in which the L2 cache of one processor cluster is extended by using a portion of the L2 cache of another processor cluster as an L3 cache.

FIGS. 5a-5c illustrate in schematic form two exemplary embodiments for dynamically extending L2 cache 112. As illustrated in FIG. 5a, a current task may be associated with CPU 108 in the Little processor cluster 102. CPU 108 and L2 cache 112 are highlighted as grayed-out boxes. In FIG. 5b, a portion 502 of L2 cache 118 (Big processor cluster 104) may be allocated as extended L2 cache for L2 cache 112 (Little processor cluster 102). FIG. 5c illustrates another embodiment in which a portion 504 of L2 cache 118 (Big processor cluster 104) is allocated as L2 cache used by L2 cache 112 (Little processor cluster 102). It should be appreciated that various cache techniques may be employed depending the hierarchy of cache levels implemented in system 100.

FIG. 6 illustrates an exemplary mapping of a physical cache 602 to a logical cache 604 for implementing the dynamic cache extension module 150. Physical cache 602 may be allocated as follows. A processor cluster A may comprise physical cache portions A1 and A2 in L2 cache A. A processor cluster B may comprise physical cache portions B1, B2, B3, and B4 in L2 cache B. A processor cluster C may comprise physical cache portions C1, C2, and C3 in L2 cache C. In operation and based on the data inputs 202 and 204, the cache scheduler 140 may allocate physical cache portions B1, B2, and B3 from L2 cache B (processor cluster B) to L2 cache A (processor cluster A). Physical cache portion B from cache B (processor cluster B) may be allocated to L2 cache C (processor cluster C). In this operational use case, the processor cluster B may be inactivated and power collapsed to conserve power consumption. FIG. 7 illustrates a mapping table 700 for implementing the physical-to-logical cache mapping of FIG. 6.

Figure 8A:
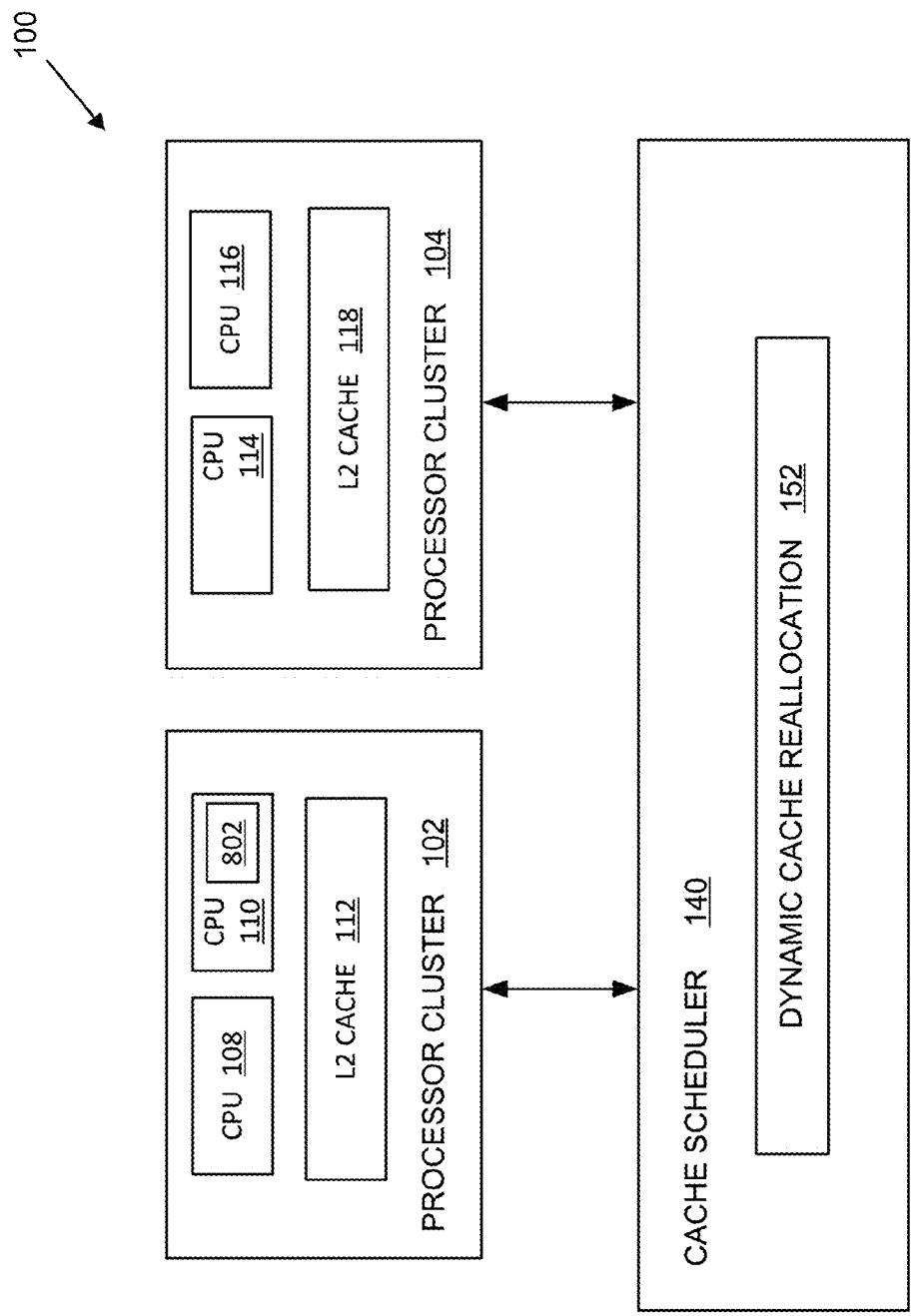
FIG. 8a is a functional block diagram illustrating an embodiment of the system of FIG. 1 for implementing dynamic cache reallocation.
Figure 8B:
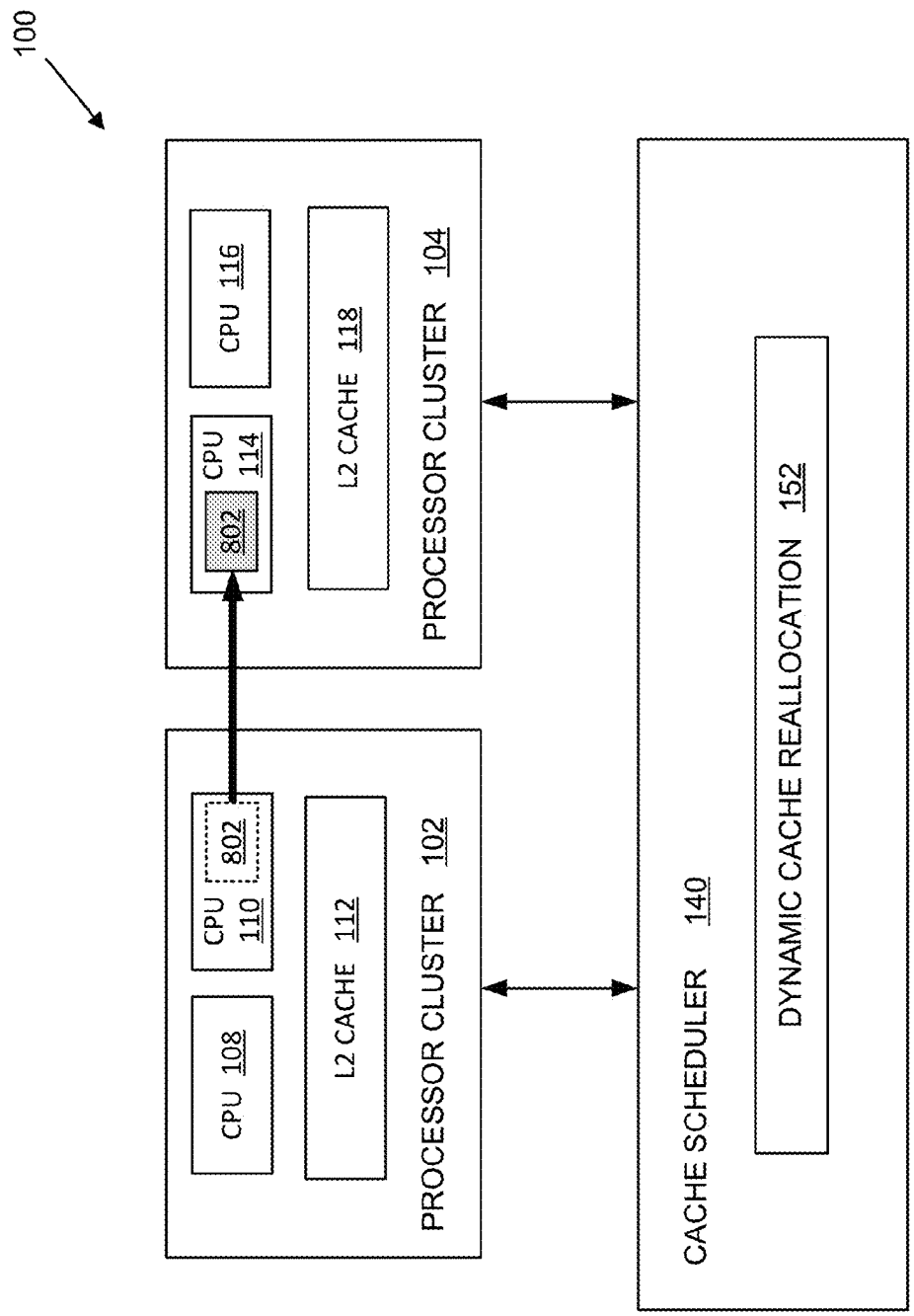
FIG. 8b illustrates the system of FIG. 8a in which a task is reallocated from one processor cluster to another processor cluster.

Referring again to FIG. 4, if the cache scheduler 140 determines that the current task is not limited by the size threshold of L2 cache 112 (decision block 406), control may flow to decision block 410 to determine if the current task is limited by the performance threshold of the L2 cache 112. If the performance threshold is not exceeded, the cache scheduler 140 may process the current task using the default L2 split mode 210 (block 412). If the performance threshold is exceeded, the cache scheduler may migrate the current task from the Little processor cluster 102 to the Big processor cluster 104 (block 414). FIGS. 8a & 8b illustrate in schematic form an exemplary task migration. In FIG. 8a, a current task 802 is associated with CPU 110 in Little processor cluster 102. As illustrated in FIG. 8b, if the performance threshold is exceeded, the cache scheduler 140 may migrate task 802 from CPU 110 to CPU 114.

According to another exemplary embodiment of the system 100, when a task is migrated from the Little processor cluster 102 to the Big processor cluster 104, L2 cache 118 in Big processor cluster 104 may fetch all of its working set from L2 cache 112 in Little processor cluster 102. Alternatively, L2 cache 118 may fetch a portion of its working set from L2 cache 112 in Little processor cluster 102 while it fetches a fresh set from main memory 144 or a lower level cache (e.g., L3 cache). In this regard, a source L2 cache may be defined as the L2 cache from which an executed thread is migrating away. The cache scheduler 140 may be further configured to keep the source L2 cache online as long as a threshold cache hit ratio is maintained from the source L2 cache. The source L2 cache may be flushed and turned off when the hit ratio falls below the threshold cache hit ratio.

Figure 9:
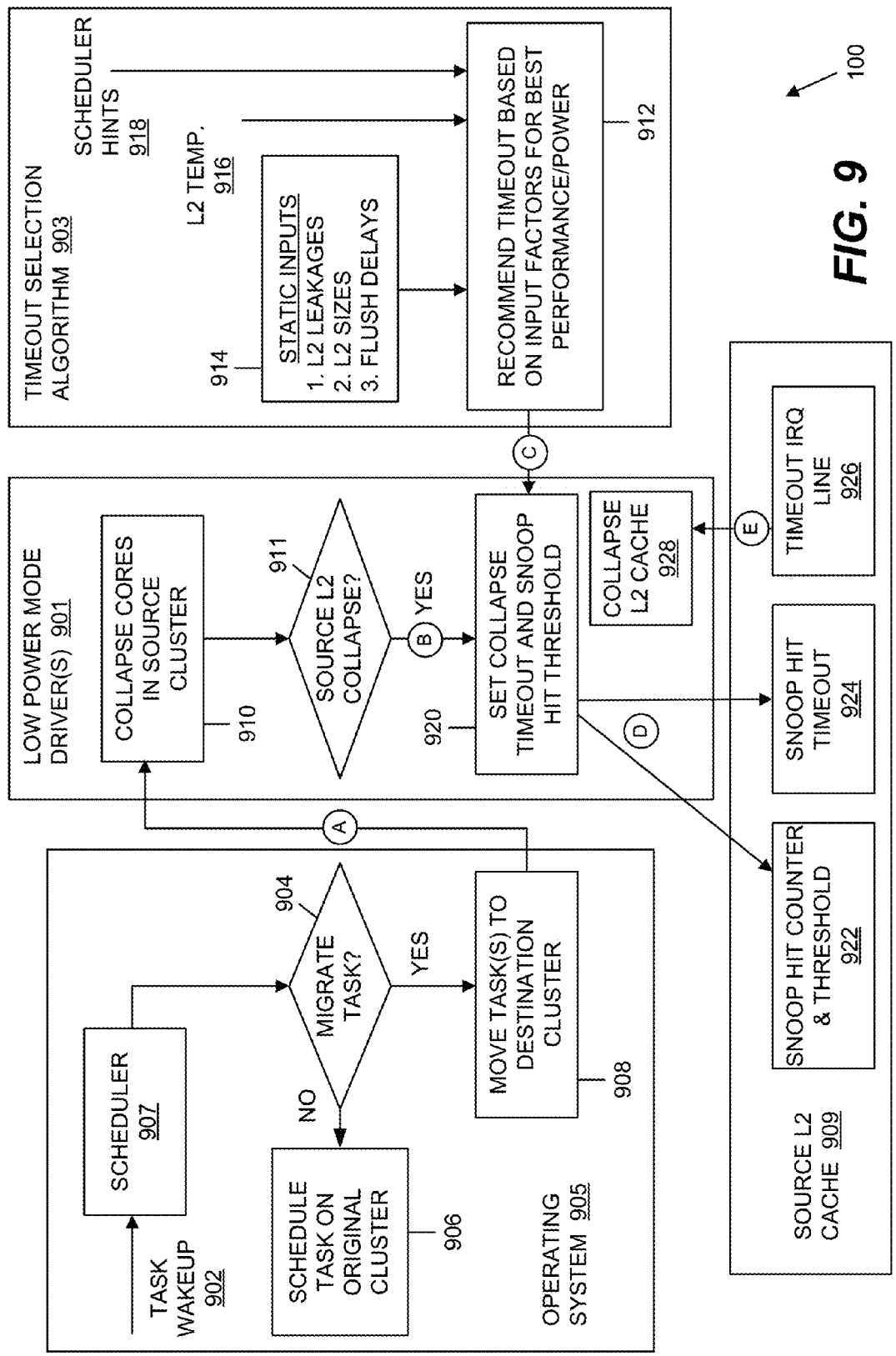
FIG. 9 illustrates another embodiment of the system of FIG. 1 for collapsing a source L2 cache after a task has been migrated to a destination L2 cache in another processor cluster based on a snoop hit counter.

As illustrated in FIG. 9, the system 100 may be configured to tune the threshold cache hit ratio to optimize performance and/or power. In an embodiment, a scheduler 907 and low power mode driver(s) 901 may be implemented in software, and the timeout selection algorithm 903 may be implemented in hardware. For example, consider the situation in which an operating system 905 frequently performs task migrations. A scheduler 907 may receive task wakeup inputs 902 and determine whether task migration should be performed (decision block 904) as described above in more detail. If the scheduler 907 determines that task migration is not to be performed, at block 906, the task may be scheduled on the original processor cluster. If task migration is desired, at block 908, the task may be migrated to a destination processor cluster.

In an exemplary embodiment, the tuning/timeout technique is represented by steps A, B, C, D, and E in FIG. 9. At step A, task migration may trigger a control signal to, for example, low power mode driver(s) 901. At block 910, the low power mode driver 901 determines whether the core(s) in the source processor should be collapsed. If the source L2 cache 909 can collapse (decision block 910), at step B, a collapse timeout and a snoot hit threshold may be set. The collapse timeout may be set (block 920) based on the recommended timeout received (step C) by the timeout selection algorithm 903. At step D, the snoop hit threshold and the snoop hit timeout may be stored in the source L2 cache 903 at blocks 922 and 924, respectively. At step E, the source L2 cache 909 may be collapsed (block 928) in response to a timeout IRQ line based on the snoot hit threshold, a snoop hit counter, and the snoop hit timeout.

Figure 10:
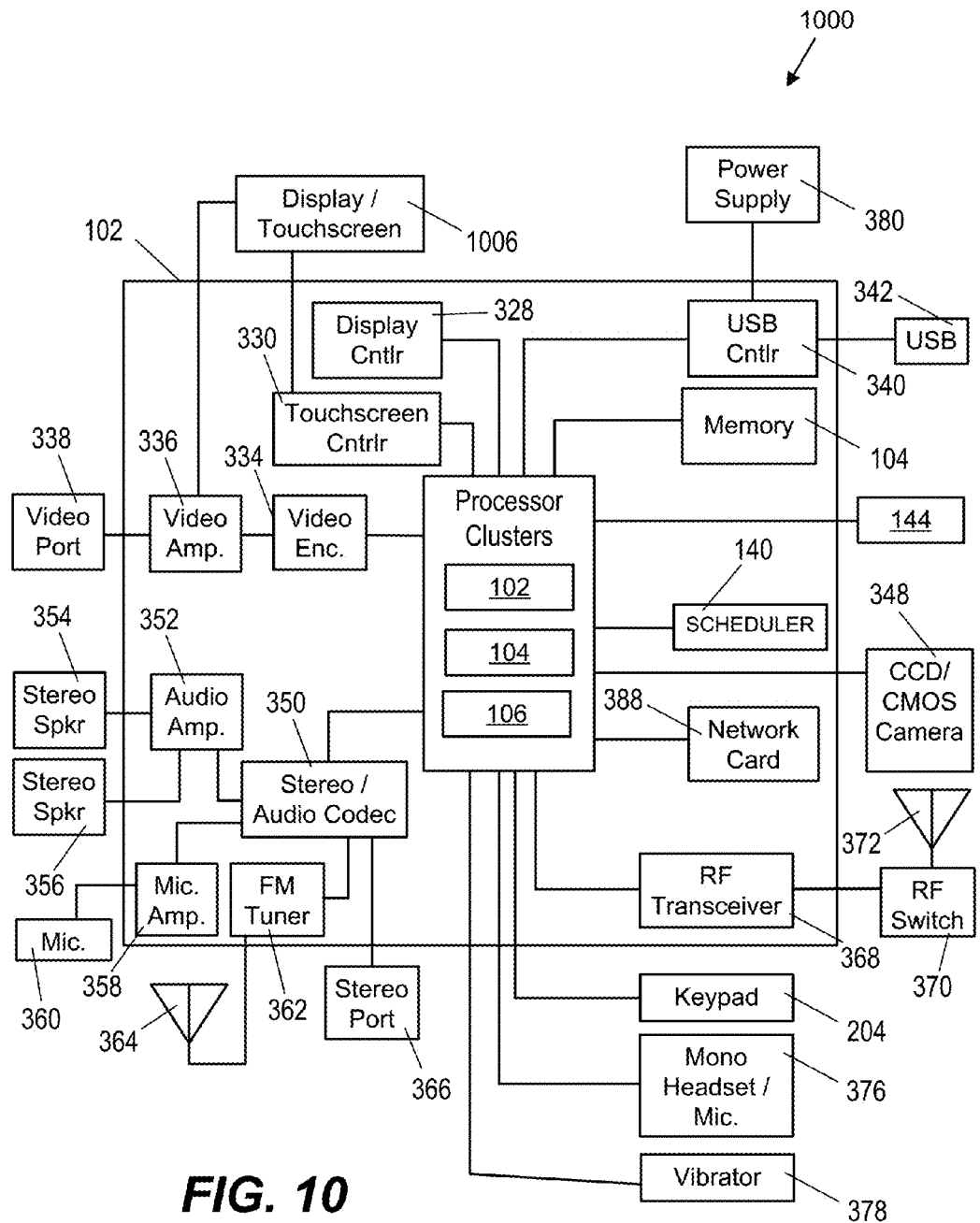
FIG. 10 illustrates the systems and methods of FIGS. 1-9 incorporated in an exemplary portable computing device (PCD).

The system 100 may be incorporated into any desirable computing system. FIG. 10 illustrates the system 100 incorporated in an exemplary portable computing device (PCD) 1000. A system-on-chip (SoC) 103 may include the cache scheduler 140 and the processor clusters 102, 104, and 106. A display controller 328 and a touch screen controller 1006 may be coupled to one or more of the processor clusters. In turn, the touch screen display 1006 external to the on-chip system 103 may be coupled to the display controller 328 and the touch screen controller 330.

FIG. 10 further shows that a video encoder 334, e.g., a phase alternating line (PAL) encoder, a sequential color a memoire (SECAM) encoder, or a national television system (s) committee (NTSC) encoder, is coupled to one or more of the processor clusters 102, 104, and 106. Further, a video amplifier 336 is coupled to the video encoder 334 and the touch screen display 1006. Also, a video port 338 is coupled to the video amplifier 336. As shown in FIG. 10, a universal serial bus (USB) controller 340 is coupled to one or more of the processor clusters. Also, a USB port 342 is coupled to the USB controller 340. Memory 144 and a subscriber identity module (SIM) card 346 may also be coupled to the processor cluster(s).

Further, as shown in FIG. 10, a digital camera 348 may be coupled to the processor cluster(s). In an exemplary aspect, the digital camera 348 is a charge-coupled device (CCD) camera or a complementary metal-oxide semiconductor (CMOS) camera.

As further illustrated in FIG. 10, a stereo audio coder-decoder (CODEC) 350 may be coupled to the processor cluster(s). Moreover, an audio amplifier 352 may coupled to the stereo audio CODEC 350. In an exemplary aspect, a first stereo speaker 354 and a second stereo speaker 356 are coupled to the audio amplifier 352. A microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 10 further illustrates that a radio frequency (RF) transceiver 368 may be coupled to the processor cluster(s). An RF switch 370 may be coupled to the RF transceiver 368 and an RF antenna 372. A keypad 204, a mono headset with a microphone 376, and a vibrator device 378 may be coupled to the processor cluster(s).

FIG. 10 also shows that a power supply 380 may be coupled to the on-chip system 103. In a particular aspect, the power supply 380 is a direct current (DC) power supply that provides power to the various components of the PCD 1000 that require power. Further, in a particular aspect, the power supply is a rechargeable DC battery or a DC power supply that is derived from an alternating current (AC) to DC transformer that is connected to an AC power source.

FIG. 10 further indicates that the PCD 1000 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, a television/cable/satellite tuner, or any other network card well known in the art. Further, the network card 388 may be incorporated into a chip, i.e., the network card 388 may be a full solution in a chip, and may not be a separate network card 388.

Referring to FIG. 10, it should be appreciated that the memory 144, the RAM card 105, touch screen display 1006, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 103.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for providing dynamic cache extension in a multi-cluster heterogeneous processor architecture in a portable computing device, the method comprising:
   receiving a processor workload input representing a measure of processor workload and a cache workload input representing a measure of cache workload for a first processor cluster and an associated first cache in a multi-cluster heterogeneous processor architecture comprising the first processor cluster and a second processor cluster having an associated second cache;
   based on the cache workload input, determining whether a current task associated with the first processor cluster is limited by a size threshold of the first cache,
   based on the processor workload input and the cache workload input, determining whether the current task associated with the first processor cluster is limited by a performance threshold of the first processor cluster and not limited by the size threshold of the first cache;
   in response to a determination that the current task is limited by the size threshold of the first cache, using at least a portion of the second cache associated with the second processor cluster as an extension of the first cache; and
   in response to a determination that the current task is limited by the performance threshold of the first processor cluster and not limited by the size threshold of the first cache, migrating the current task from the first processor cluster to the second processor cluster.

2. The method of claim 1, further comprising:
   monitoring a snoop hit counter associated with the first cache; and
   collapsing the first cache if the snoop hit counter falls below a threshold or a collapse timeout is reached.

3. The method of claim 1, wherein the processor workload input comprises information related to one or more of a number of instructions per clock, a number of instructions per unit time, a frequency level, and a processor active duration percentage, and the cache workload input comprises information related to one or more of a number of cache misses, a number of cache accesses, a cache miss rate, and a processor stall time or a number of processor stalls due to cache misses.

4. The method of claim 1, wherein the determining the current task associated with the first processor cluster is limited by the performance threshold of the first processor cluster comprises:
   determining one or more of a number of instructions per clock cycle, a number of instructions per unit time, a frequency level, and a processor active duration percentage associated with a first processor in the first processor cluster exceeds the performance threshold.

5. The method of claim 1, wherein the determining the current task associated with the first processor cluster is limited by the size threshold of the first cache comprises:
   determining one or more of a number of cache misses, a number of cache accesses, a cache miss rate, and a processor stall time or a number of processor stalls due to cache misses exceeds the size threshold.

6. The method of claim 1, wherein the first processor cluster comprises one or more processor devices having a first processor type and the second processor cluster comprises one or more processor devices having a second processor type.

7. The method of claim 6, wherein the first and second processor types comprise one or more of a multi-core processor, a central processing unit (CPU), a graphics processor unit (GPU), and a digital signal processor (DSP).

8. The method of claim 1, wherein the multi-cluster heterogeneous processor architecture comprises a heterogeneous architecture in which the first processor cluster comprises one or more processor cores having a lower power than one or more processor cores comprising the second processor cluster, and wherein the first cache in the first processor cluster has a smaller size than the second cache in the second processor cluster.

9. The method of claim 1, wherein the first cache and the second cache comprise a level two (L2) cache for the associated processor cluster, and wherein the using at least the portion of the second cache associated with the second processor cluster as an extension of the first cache comprises: using the second cache as a level three (L3) cache for the first processor cluster.

10. A system for providing dynamic cache extension in a multi-cluster heterogeneous processor architecture in a portable computing device, the system comprising:
   means for receiving a processor workload input representing a measure of processor workload and a cache workload input representing a measure of cache workload for a first processor cluster and an associated first cache in a multi-cluster heterogeneous processor architecture comprising the first processor cluster and a second processor cluster having an associated second cache;

means for determining, based on the cache workload input, whether a current task associated with the first processor cluster is limited by a size threshold of the first cache, means for determining, based on the processor workload input and the cache workload input, whether the current task associated with the first processor cluster is limited by a performance threshold of the first processor cluster and not limited by the size threshold of the first cache;

means for using at least a portion of the second cache associated with the second processor cluster as an extension of the first cache in response to a determination that the current task is limited by the size threshold of the first cache; and means for migrating the current task from the first processor cluster to the second processor cluster in response to a determination that the current task is limited by the performance threshold of the first processor cluster and not limited by the size threshold of the first cache.

11. The system of claim 10, further comprising:

means for monitoring a snoop hit counter associated with the first cache; and means for collapsing the first cache if the snoop hit counter exceeds a threshold or a collapse timeout is reached.

12. The system of claim 10, wherein the processor workload input comprises information related to one or more of a number of instructions per clock cycle, a number of instructions per unit time, a frequency level, and a processor active duration percentage, and the cache workload input comprises information related to one or more of a number of cache misses, a number of cache accesses, a cache miss rate, and a processor stall time or a number of processor stalls due to cache misses.

13. The system of claim 10, wherein the means for determining the current task associated with the first processor cluster is limited by the performance threshold of the first processor cluster comprises:

means for determining one or more of a number of instructions per clock cycle, a number of instructions per unit time, a frequency level, and a processor active duration percentage associated with a first processor in the first processor cluster exceeds the performance threshold.

14. The system of claim 10, wherein the means for determining the current task associated with the first processor cluster is limited by the size threshold of the first cache comprises:

means for determining one or more of a number of cache misses, a number of cache accesses, a cache miss rate, and a processor stall time or a number of processor stalls due to cache misses exceeds the size threshold.

15. The system of claim 10, wherein the first processor cluster comprises one or more processor devices having a first processor type and the second processor cluster comprises one or more processor devices having a second processor type.

16. The system of claim 15, wherein the first and second processor types comprise one or more of a multi-core processor, a central processing unit (CPU), a graphics processor unit (GPU), and a digital signal processor (DSP).

17. The system of claim 10, wherein the multi-cluster heterogeneous processor architecture comprises a heterogeneous architecture in which the first processor cluster comprises one or more processor cores having a lower power than one or more processor cores comprising the second processor cluster, and wherein the first cache in the first processor cluster has a smaller size than the second cache in the second processor cluster.

18. The system of claim 10, wherein the first cache and the second cache comprise a level two (L2) cache for the associated processor cluster, and wherein the using at least the portion of the second cache associated with the second processor cluster as an extension of the first cache comprises: using the second cache as a level three (L3) cache for the first processor cluster.

19. A computer program embodied in a non-transitory computer-readable medium and executable by a processor for providing dynamic cache extension in a multi-cluster heterogeneous processor architecture in a portable computing device, the computer program comprising logic configured to:

receive a processor workload input representing a measure of processor workload and a cache workload input representing a measure of cache workload for a first processor cluster and an associated first cache in a multi-cluster heterogeneous processor architecture comprising the first processor cluster and a second processor cluster having an associated second cache;

based on the cache workload input, determine whether a current task associated with the first processor cluster is limited by a size threshold of the first cache;

based on the processor workload input and the cache workload input, determining whether the current task associated with the first processor cluster is limited b a performance threshold of the first processor cluster and not limited by the size threshold of the first cache;

in response to a determination that the current task is limited by the size threshold of the first cache, using at least a portion of the second cache associated with the second processor cluster as an extension of the first cache; and in response to a determination that the current task is limited by the performance threshold of the first processor cluster and not limited by the size threshold of the first cache, migrate the current task from the first processor cluster to the second processor cluster.

20. The computer program of claim 19, further comprising logic configured to:

monitor a snoop hit counter associated with the first cache; and collapse the first cache if the snoop hit counter exceeds a threshold or a collapse timeout is reached.

21. The computer program of claim 19, wherein the processor workload input comprises information related to one or more of a number of instructions per clock cycle, a number of instructions per unit time, a frequency level, and a processor active duration percentage, and the cache workload input comprises information related to one or more of a number of cache misses, a number of cache accesses, a cache miss rate, and a processor stall time or a number of processor stalls due to cache misses.

22. The computer program of claim 19, wherein the logic configured to determine the current task associated with the first processor cluster is limited by the performance threshold of the first processor cluster comprises logic configured to:

determine one or more of a number of instructions per clock cycle, a number of instructions per unit time, a frequency level, and a processor active duration percentage associated with a first processor in the first processor cluster exceeds the performance threshold.

23. A system having a multi-cluster heterogeneous processor architecture for providing dynamic cache extension, the system comprising:
- a first processor cluster comprising a first level 2 (L2) cache;
- a second processor cluster comprising a second L2 cache; and
- a controller in communication with the first and second L2 caches, the controller configured to:
  - receive a processor workload input representing a measure of processor workload and a cache workload input representing a measure of cache workload from the first processor cluster;
  - based on the cache workload input, determine whether a current task associated with the first processor cluster is limited by a size threshold of the first L2 cache;
  - based on the processor workload input and the cache workload input, determine whether the current task associated with the first processor cluster is limited by a performance threshold of the first processor cluster and not limited by the size threshold of the first L2 cache;
  - in response to a determination that the current task is limited by the size threshold of the first L2 cache, using at least a portion of the second L2 cache associated with the second processor cluster as an extension of the first L2 cache; and
  - in response to a determination that the current task is limited by the performance threshold of the first processor cluster and not limited by the size threshold of the first L2 cache, migrate the current task from the first processor cluster to the second processor cluster.

24. The system of claim 23, wherein the controller is further configured to:
- monitor a snoop hit counter associated with the first L2 cache; and
- collapse the first cache if the snoop hit counter exceeds a threshold or a collapse timeout is reached.

25. The system of claim 23, wherein the processor workload input comprises information related to one or more of a number of instructions per clock cycle, a number of instructions per unit time, a frequency level, and a processor active duration percentage, and the cache workload input comprises information related to one or more of a number of cache misses, a number of cache accesses, a cache miss rate, and a processor stall time or a number of processor stalls due to cache misses.

26. The system of claim 23, wherein the determining the current task associated with the first processor cluster is limited by the performance threshold of the first processor cluster comprises:
- determining one or more of a number of instructions per clock cycle, a number of instructions per unit time, a frequency level, and a processor active duration percentage associated with a first processor in the first processor cluster exceeds the performance threshold.

* * * * *